Sept. 17, 1963  E. H. EVALDS  3,104,385
TEMPERATURE SENSITIVE BRIDGE CIRCUITS
Filed Feb. 25, 1959

United States Patent Office 3,104,385
Patented Sept. 17, 1963

3,104,385
TEMPERATURE SENSITIVE BRIDGE CIRCUITS
Egils H. Evalds, Philadelphia, Pa., assignor to Robertshaw Controls Company, a corporation of Delaware
Filed Feb. 25, 1959, Ser. No. 795,377
7 Claims. (Cl. 340—233)

This invention relates generally to temperature responsive bridge circuits and more particularly to a bridge circuit of the temperature sensitive type which may be set to give an alarm at any preselected temperature over a wide range.

An object of this invention is a temperature sensitive bridge circuit characterized by its simplicity.

Another object of this invention is a temperature sensitive bridge circuit which utilizes the secondary winding of an input transformer as a plurality of the bridge arms thereof.

Still another object of this invention is to energize an electron discharge device and Wheatstone bridge circuit from a common A.C. source and utilize unbalance in the bridge circuit to control the flow of current through the electron discharge device.

A further object of this invention is to utilize a separate span adjustment to facilitate adjustment of a Wheatstone bridge to any desired range of operation.

In carrying out the preferred embodiment of this invention, the voltage output of a resistance-inductance bridge circuit is utilized to activate a phase sensitive detector which is connected to the same source of potential as the bridge circuit. A temperature sensitive resistor comprises one arm of the bridge circuit and is adapted to unbalance the bridge circuit in one direction or another in response to temperature variations from preselected values so as to vary the voltage output of the bridge circuit from one phase to the opposite phase, respectively. Alarm means are connected to the phase sensitive detector and responsive to activation thereof to indicate unbalance of the bridge circuit in only one direction.

Figure 1:
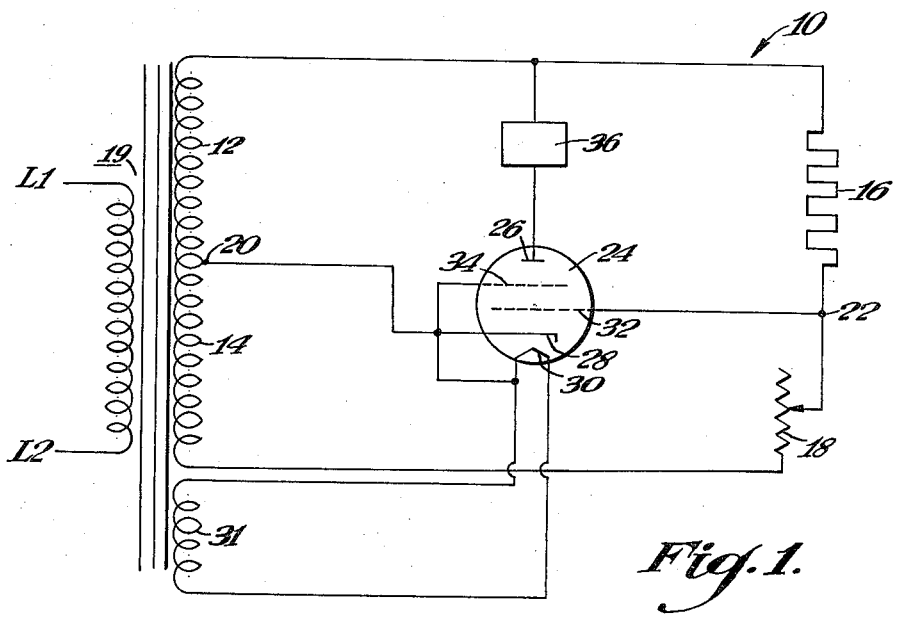
Figure 2:
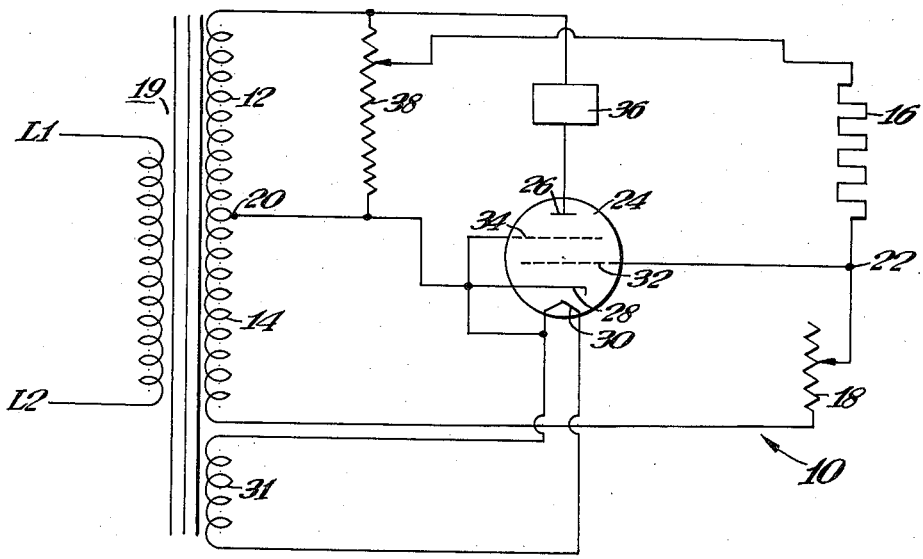

These and other objects will become apparent from the following description of the invention, taken in connection with the following drawings, wherein:

FIG. 1 is a diagrammatic showing of one embodiment of the bridge circuit of the present invention; and FIG. 2 is similar to FIG. 1 showing a modification of the bridge circuit of the present invention.

Referring to FIG. 1, the bridge circuit of this invention is shown comprising a Wheatstone bridge circuit indicated generally at 10. The bridge 10 has a pair of fixed impedance windings 12, 14 forming one of the pair of its arms. The windings 12 and 14 may be conveniently formed by a center tapped secondary winding of a transformer 19 which has its primary winding connected to a suitable source of alternating current potential at L1 and L2 for energizing the bridge 10.

The other pair of arms for the bridge 10 are formed by a temperature sensitive resistor or thermistor 16, adapted to be positioned at a temperature condition to be indicated and/or controlled and a resistor 18, adjustable by means, not shown, to select the temperature condition at which the bridge 10 will be in a condition of balance.

The potentials of the junctions 20, located intermediate windings 12 and 14, and 22, located intermediate the thermistors 16 and resistor 18, bear a relationship to each other which is a function of the relative resistance values of the thermistor 16 and resistor 18. These potentials and the relationship therebetween are utilized to activate a phase sensitive detector during conditions of bridge unbalance. The phase sensitive detector is shown comprising a gaseous electron discharge device 24 having the usual anode 26, cathode 28, cathode heater 30, and control electrode 32. Electron discharge device 24 may further be provided with a screen grid 34 which is suitably connected to the cathode 28 and cathode heater 30. The cathode heater 30 may be supplied with operating potential from a suitable secondary winding 31 provided on the transformer 19.

To complete the circuit for the phase sensitive detector, cathode 28 is connected to the junction 20, the control electrode 32 is connected to the junction 22, and the anode 26 is connected to the junction intermediate the resistor 16 and winding 12. A sensitive alarm device 36 is connected between anode 26 and the junction intermediate resistor 16 and winding 12 to be actuated by the flow of anode current from the electron discharge device 24. Alarm device 36 may appropriately be a bulb, horn, or bell if the circuit of this invention is to be utilized for alarm purposes, whereas, if controlling operation is to be performed, it may be a suitable relay means for initiating and terminating a heating operation at the thermistor 16.

An alternating current output signal appears at junction 22 only under conditions of bridge unbalance and the phase of this signal is dependent upon the direction of bridge unbalance. When the magnitude of resistor 18 is greater than that of thermistor 16, this signal differs in phase by 180° from the signal developed when the magnitude of thermistor 16 is greater than that of resistor 18. Thus, with resistor 18 set to a value which is less than that of thermistor 16, in a cold condition, and with power initially applied at L1, L2, the potential at junction 22 will be 180° out of phase with the voltage appearing on winding 12 above junction 20. The grid 32 of electron discharge device 24 has an alternating voltage bias thereon which is opposite in phase to the alternating voltage on the anode 26 and such bias will be of sufficient magnitude to normally prevent firing of the electron discharge device 24 during those periods when anode 26 is positive.

With thermistor 16 now disposed at the temperature condition to be sensed, the resistance of thermistor 16 will decrease with an increase in the magnitude of the temperature condition since the resistance of a conventional thermistor is inversely proportional to its temperature. When the magnitude of the impedance of thermistor 16, upon continued heating thereof, is exceeded by the magnitude of resistor 18, the alternating signal voltage applied to grid 32 will be in phase with the voltage applied to anode 26 and the electron discharge device 24 will be triggered into conduction in accordance with the well known characteristics of this type of electron discharge device. The electron discharge device will continue to conduct until the anode voltage drops below the value required to maintain the electron discharge device in a conducting state. Conduction thus occurs during one-half of each cycle of the alternating current anode voltage.

When electron discharge device 24 conducts, alarm means 36 will be energized to either give audible or visible indication of this condition or initiate corrective measures to reduce the temperature condition at resistor 16 in accordance with the characteristics thereof.

In the embodiment of FIG. 2, means are provided to extend the span or range of temperature conditions to which the components of the embodiment of FIG. 1 will be responsive. A potentiometer 38 is connected across the winding 12 and provided with a sliding contact connected to the thermistor 16.

By adjusting the position of the sliding contact on potentiometer 38, the alternating current potential impressed upon the bridge arms comprising thermistors 16 and resistor 18 can be made substantially less than the A.C. potential impressed upon the bridge arms comprising windings 12 and 14. Thus, for any given setting of the resistor 18, a different desired temperature condition at the thermistor 16 will produce bridge balance in accordance with the preselected position of the sliding contact on potentiometer 38.

While not limited thereto, the embodiments of FIGS. 1 and 2 have been found useful as a meat thermometer with the adjustable resistor 18 being adapted to be set to a preselected "doneness" of the meat. When thus utilized, the circuitry of the embodiments of FIGS. 1 and 2 may be disposed in a suitable portable enclosure (not shown), adapted to be placed externally of the oven or other heated chamber (not shown), into which the meat is placed with the thermistor 16 disposed in a suitable probe (not shown), adapted to be inserted into the meat being cooked. The thermistor 16 may be connected to the remainder of the circuitry by a suitable length of substantially flat heat resistant wire (not shown). With this arrangement, electron discharge device 24 will be operative only when the bridge circuit is unbalanced in the direction to indicate that the meat is done. Since electron discharge device 24 operates as a phase sensitive detector, it will not give erroneous indication when the bridge is unbalanced in the opposite direction. Moreover, since electron discharge device 24 does not draw current until an excessive temperature has been reached, any current drawn by the electron discharge device does not upset the balance of the bridge 10.

Although specific embodiments of the invention have been shown and described, it will be apparent to those skilled in the art that many modifications may be made. Such modifications may be made in the details of construction and arrangement of parts without departing from the scope of the invention as set forth in the appended claims.

I claim:

1. Control apparatus comprising a bridge circuit including a power transformer having a tapped secondary winding, a series circuit including a resistance element means connected in series with an impedance element having a negative temperature coefficient, means connecting the ends of said series circuit to said secondary winding, said bridge circuit having output terminals provided by said tap and by the point of connection of said resistance element and said impedance element and providing an output signal at said terminals which is positive or negative dependent on whether the ratio of the value of said impedance element to the value of said resistance element is less or greater than unity; an electron discharge device having an anode, cathode and control element; means connecting said control element to one of said output terminals and means connecting said cathode to the other of said output terminals; and means connecting said anode to said secondary winding at said end thereof connected to said impedance element to render said electron discharge device conducting in response to one phase of the output signal of said bridge circuit corresponding to temperatures above one limit and non-conducting at temperatures less than said limit.

2. Attained temperature responsive apparatus comprising a bridge circuit including a transformer having a tapped secondary winding, a resistor connected between one end of said secondary winding and said tap, a series circuit including a resistance element connected in series with a thermistor element having known resistance at a selected temperature and a higher resistance below said temperature, means including a portion of said resistor connecting the ends of said series circuit to the ends of said secondary winding, said bridge circuit having output terminals provided by said tap and by the point of connection of said resistance element to said thermistor element and providing when the transformer secondary voltage at said one end is positive relative to said tap an output signal at said point of connection which is negative at temperatures less than said selected temperature; an electron discharge device having an anode, cathode and control element; means connecting said control element to the one of said output terminals at said point of connection; means connecting said cathode to the other of said output terminals; and means connecting said anode to said secondary winding at said one end to cause said electron discharge device to conduct in response to the output signal of said bridge circuit during positive half cycles of energization of said anode only when said thermistor attains said selected temperature.

3. In an attained temperature responsive device operated by A.C. from the secondary of a transformer the combination of a transformer secondary winding having terminals at the ends thereof and a center tap to provide a neutral connection for a Wheatstone bridge, a thermistor connected at one end to a first said terminal to form an impedance arm of said bridge having a negative temperature coefficient, a resistor connected at one end to a second said terminal and at the other end thereof to said thermistor to form a series load circuit for said secondary winding, thereby to complete said bridge, thyratron control means having therein a cathode and a control element connected one to said center tap and the other to said thermistor connection to said resistor and further having an anode energized from said first terminal, means adjusting the resistance of said resistor to equal that of said thermistor at a selected temperature, and indicating means series connected between said anode and said first terminal responsive only to bridge unbalance of one sign, thereby to indicate an attained temperature as the resistance of said thermistor decreases below that of said resistor.

4. A Wheatstone bridge circuit operative to produce an output only at temperatures above a selected temperature, comprising a transformer primary supplied with A.C. current, a transformer secondary having a centertap and a pair of end terminals forming the energization source and one leg of said bridge, an adjustable impedance element connected in series with an impedance element of negative temperature coefficient said elements being connected at said terminals, respectively, to form a second leg of said bridge, means adjusting said adjustable impedance to the impedance value of the other said element at a particular selected temperature below which the higher relative value of the adjustable impedance unbalances the bridge in a negative sense, electron discharge means connected for energization between said terminal connected to the second said impedance element and said centertap to effect a discharge therethrough only during positive voltage energization thereat, a control element in said discharge means held at the potential of the junction of said impedance elements and thereby biased to prevent conduction during said positive voltage energization when said bridge is unbalanced in said negative sense, and means in series with said discharge means for indicating the presence of conduction therein.

5. An A.C. energized bridge whereof one leg constitutes the source of bridge energizing voltage and includes first and second A.C. terminals and a center terminal of normally unvarying voltage and whereof the remaining leg is a load circuit between said A.C. terminals, consisting of a thermistor connected in series with a resistor adjusted to an impedance equaling the thermistor impedance at a selected temperature, a thyratron having an anode connected for conductive energization from said first A.C. terminal during positive voltage half cycles thereat, having a cathode connected to said center terminal and having a grid therein at the potential of said series connection of the resistor to the thermistor, said thermistor being thereby connected in parallel across the anode-to-grid circuit of the thyratron for preventing conduction in the thyratron during said voltage half cycles unless the thermistor is at a temperature at least equal to said selected temperature and a utilization circuit connected in series with said thyratron and responsive to current therethrough when the temperature at said thermistor reaches said selected temperature.

6. In the A.C. bridge of claim 5, said utilization circuit including means generating an alarm signal actuated only as said selected temperature is reached.

7. In the A.C. bridge of claim 5 variable voltage dividing means connected between said center terminal and said terminal at which said anode is connected, said thermistor being connected at a voltage point in said dividing means lower than said first terminal, thereby to vary the range of operation of the device and the temperature of balance of the bridge.

References Cited in the file of this patent
UNITED STATES PATENTS

| | | |
|---|---|---|
| 2,431,158 | Yates | Nov. 18, 1947 |
| 2,492,174 | Noble et al. | Dec. 27, 1949 |
| 2,510,039 | Rudahl | May 30, 1950 |
| 2,510,041 | Rudahl | May 30, 1950 |
| 2,535,133 | Hoch | Dec. 26, 1950 |
| 2,616,018 | Karp et al. | Oct. 28, 1952 |
| 2,832,946 | Beck | Apr. 29, 1958 |
| 2,979,596 | Karp | Apr. 11, 1961 |